(12) United States Patent
Mueller et al.

(10) Patent No.: US 7,703,694 B2
(45) Date of Patent: Apr. 27, 2010

(54) THERMOSTAT CAPABLE OF DISPLAYING RECEIVED INFORMATION

(75) Inventors: Carl J. Mueller, St. Louis, MO (US); John M. Sartain, St. Louis, MO (US); Steven L. Carey, St. Louis, MO (US); Thomas J. Fredricks, St. Louis, MO (US); Ronald E. Miles, St. Louis, MO (US); G. Scott Vogel, St. Louis, MO (US); James P. Garozzo, St. Louis, MO (US)

(73) Assignee: Emerson Electric Co., St. Louis, MO (US)

( * ) Notice: Subject to any disclaimer, the term of this patent is extended or adjusted under 35 U.S.C. 154(b) by 74 days.

(21) Appl. No.: 12/250,204

(22) Filed: Oct. 13, 2008

(65) Prior Publication Data

US 2009/0045263 A1  Feb. 19, 2009

Related U.S. Application Data

(63) Continuation of application No. 11/156,391, filed on Jun. 20, 2005, now Pat. No. 7,434,742.

(51) Int. Cl.
*G05D 23/00* (2006.01)
(52) U.S. Cl. ............................ 236/51; 236/94; 700/276
(58) Field of Classification Search ................... 236/51, 236/94; 700/276
See application file for complete search history.

(56) References Cited

U.S. PATENT DOCUMENTS

| 4,341,345 | A | 7/1982 | Hammer et al. | ............ 236/46 R |
| 6,480,803 | B1 | 11/2002 | Pierret et al. | ................ 702/130 |
| 6,591,620 | B2 | 7/2003 | Kikuchi et al. | ................ 62/126 |
| 6,628,997 | B1 | 9/2003 | Fox et al. | ...................... 700/86 |
| 7,130,719 | B2 | 10/2006 | Ehlers et al. | ................ 700/276 |
| 7,172,132 | B2 | 2/2007 | Proffitt et al. | ............... 236/1 C |
| 7,274,972 | B2 * | 9/2007 | Amundson et al. | .......... 700/276 |
| 2007/0012052 | A1 * | 1/2007 | Butler et al. | .................. 62/181 |

OTHER PUBLICATIONS http://www.ersus.com, Retail Services ProAct Setpoint Verification.

* cited by examiner

*Primary Examiner*—Marc E Norman
(74) *Attorney, Agent, or Firm*—Harness, Dickey & Pierce, P.L.C.

(57) ABSTRACT

A thermostat for controlling a climate control system is provided that comprises a network interface for establishing an internet connection with a website of a remote service provider, and a microprocessor for controlling the operation of a climate control system. The microprocessor is in communication with the network interface for establishing an internet connection and receiving user-specified information from a remote service provider that maintains a user-profile of information requested by the user. The thermostat further comprises a display device responsive to the microprocessor for displaying user-specified information received via the network controller from the remote service provider.

16 Claims, 3 Drawing Sheets

THERMOSTAT CAPABLE OF DISPLAYING RECEIVED INFORMATION

CROSS-REFERENCE TO RELATED APPLICATIONS

This application is a continuation of U.S. patent application Ser. No. 11/156,391 filed on Jun. 20, 2005, now U.S. Pat. No. 7,434,742, the entire disclosure of the above application is incorporated herein by reference.

FIELD

The present invention relates generally to thermostats for controlling climate control systems, and more particularly to touch-screen thermostats having the capability of displaying information to a user.

BACKGROUND

Many digital programmable thermostats possess a display screen of a size that is limited by the necessary placement of control buttons around the display. A touch-screen thermostat can enable the display size to be increased by incorporating the buttons into the display device. A touch screen thermostat can also provide more area for displaying additional information to the user. However, the typical thermostat does not possess the network interface or processing capacity to enable the thermostat to obtain information from an external source. Furthermore, obtaining information through connection with an external source would require the user to tediously enter a series of inputs to request specific information, and the external source to complete a series of searches or operations to locate and retrieve the requested information. A user of a thermostat would not likely request the thermostat to obtain such desired information, given the difficulty of the user entering a request to the thermostat, and the operations involved in retrieving the information.

SUMMARY

Various embodiments of a programmable touch-screen thermostat for controlling a climate control system are disclosed that provide a simple, convenient method for programming the thermostat. According to one aspect of the present invention, one embodiment of a thermostat comprises a network interface for establishing an internet connection with a website of a remote service provider, and a microprocessor for controlling the operation of a climate control system. The microprocessor is in communication with the network interface for establishing an internet connection and receiving user-specified information from a remote service provider that maintains a user-profile of information requested by the user. The thermostat further comprises a display device responsive to the microprocessor for displaying user-specified information received via the network controller from the remote service provider.

In another aspect of the invention, a second embodiment of a thermostat for controlling a climate control system is provided that comprises a network interface for establishing an internet connection with a website of a remote service provider, and a microprocessor for controlling the operation of a climate control system. The microprocessor is in communication with the network interface for establishing an internet connection and requesting a stored temperature value from the remote service provider that the user subscribes to, wherein the microprocessor temporarily changes the temperature set point to the requested stored temperature value for a predetermined time period. The thermostat further comprises a display device responsive to the microprocessor for displaying the temperature value requested and received from the remote service provider, wherein the user of the thermostat may respond to the change in set point to the received temperature value displayed on the display device by adjusting the temperature set point to override the set point temperature value received from the remote service provider.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

DRAWINGS

The present invention will become more fully understood from the detailed description and the accompanying drawings, wherein.

Corresponding reference numerals indicate corresponding parts throughout the several views of the drawings.

DETAILED DESCRIPTION

The following description of the various embodiments are merely exemplary in nature and are in no way intended to limit the invention, its application, or uses.

Figure 1:
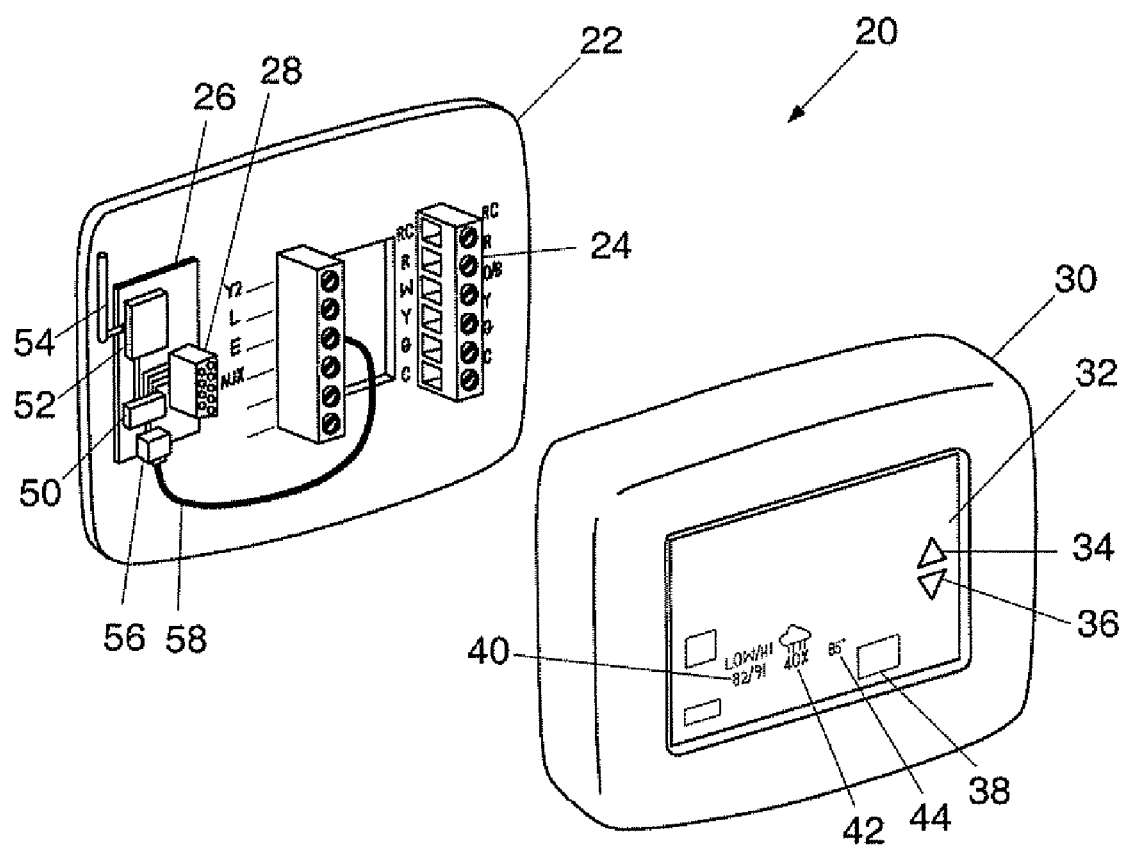
FIG. 1 is a perspective view of one embodiment, shown disassembled, of a thermostat in accordance with the present invention.

An exemplary embodiment of a thermostat 20 according to the principles of the present invention is shown in FIG. 1. The thermostat 20 comprises a sub-base portion 22 and a thermostat display portion 30 adapted to connect to the sub-base portion 22. The sub-base portion 22 preferably comprises a plurality of connectors 24 for connecting to a climate control system, and a network controller 26 having a connector 28 for communicating to the thermostat display portion 30 of the thermostat 20. The thermostat display portion 30 preferably comprises a microprocessor (not shown), for controlling the operation of the thermostat, and for communicating through the network controller 26 via connector 28 with an internet website or server external to the thermostat.

In various exemplary embodiments, the thermostat 20 comprises a thermostat display portion 30 adapted to connect to the sub-base portion 22 in a manner that establishes a connection to a climate control system via a plurality of connectors 24, and also a connection to a network controller 26 via a connector 28. The network controller 26 enables the thermostat 20 to periodically receive user-specified information from an external location, for display on a display device 32 or for use in controlling the thermostat 20. The thermostat display portion 30 preferably comprises a display device 32 capable of displaying user-specified information such as weather forecast information 40 or a user-specified temperature override 44, which is received from an internet website or server external from the thermostat 20.

In one embodiment, the network controller 26 may be a wireless LAN/modem network interface control or Access Point (AP). The network control 26 may be a circuit comprising an internet controller chip 50 that is in communication with a Wireless LAN chip 52, and a dial-up modem 56 having a phone jack for connection with a phone line 58. The internet controller chip 50 may be an ichip C0710AG/66BI-3 manufactured by ConnectOne, which may be integrated with a wireless LAN chip 52 such as a PRISM 3.0 802.11b wireless LAN chip set, and a dial-up modem 56, such as a MT5600SMI embedded modem manufactured by Multi-tech and an RJ-11 phone jack connection. The wireless LAN chip 52 may be in communication with an antenna device 54, that is either trace mounted on the network interface, or externally mounted. The network control 26 may preferably communicate via a 9-pin RS-232 interface connector 28 to a microprocessor (not shown) that is within the thermostat display portion 30. Thus, the network control or interface 26 may provide an internet connection through either a dial-up modem and phone connection or though wireless communication to a wireless router or WiFi 802.11b broadband service within a range of 300 meters. In either the wired or wireless connection, the network control 26 provides a 48 bit binary MAC number for identifying the thermostat, and provides the Transport Control Protocol and Internet Protocol (TCP/IP) necessary for accessing an internet URL, for example www-.ersus.com.

Alternatively, the network interface 26 may be a commercially available component, such as the AirWave WiFi wireless LAN, AW-ST-CB-EA-RS232 sold by Alpine Technology Ltd. This network control also provides wireless connectivity to a device via a RS232 9-pin interface connector 28. Other commercially available wireless LAN/modem cards include the Actiontec Mini 802.11 B Modem Combo Card manufactured by Actiontec.

In other embodiments, the thermostat 20 may comprise a connector 28 in connection with a network controller 26 having only a dial-up modem 56 and RJ-11 phone jack, for connecting to an external phone line 58 to establish a dial-up connection for accessing the internet. An example of such a dial-up modem is a MT5656RJ-92 56K RJ embedded modem with an integral RJ-11 form factor phone connector, manufactured by Multi-tech. In these embodiments, a more economical thermostat 20 is provided for establishing a wired connection for accessing an internet website.

In one first embodiment, a thermostat display portion 30 comprises a display device 26 responsive to a microprocessor within the thermostat display portion 30, where the microprocessor is capable of requesting and receiving communication of information through the connector 28 and network interface 26 to an external location or internet website. The microprocessor generally comprises a program for controlling the operation of the thermostat and climate control system in connection with the plurality of connectors 24. Such thermostat programs for controlling the operation of a climate control system are prevalently used. As such, the program of the microprocessor for controlling the operation of the thermostat and climate control system will not be discussed in detail. The microprocessor may be configured to periodically request a connection via the network interface 26 to a server in an external location, or to the internet 110, for accessing a website and retrieving user-specified information. For example, the external location could be an internet website of a service provider that a user may establish a user-profile for requesting specific information to be retrieved and stored in memory in an external location, such as a server maintained by the service provider entity. One example of such a service provider is Emerson Retail Services.

The first embodiment of a thermostat for displaying information utilizes a username and password associated with the server or website through which informational services are obtained. Preferably, the user may enter a username and password into the thermostat 20 that the user has set up through the website. The thermostat 20 may then periodically establish connection through the internet to the website which offers the services of providing specific information or changing set point temperature. For example, the site could be Emerson Retail Services website http://www.ersus.com, or login site http://biztools.ersus.com/discoverer4i/ viewer?_but=Connect&db=rpt. The thermostat 20 could establish connection with the internet to access the website and provide a username and password to logon to the website or webpage. Upon verification of logon information, the website would then retrieve and communicate an ASCII format text message to the thermostat 20. The thermostat's microprocessor could then respond by displaying the exact text message received, in part or in its entirety (depending on the amount of text), on the display device 32. For example, the ASCII text message received could comprise values of the local high and low forecast temperatures, the chance of precipitation, and other information.

Figure 2:
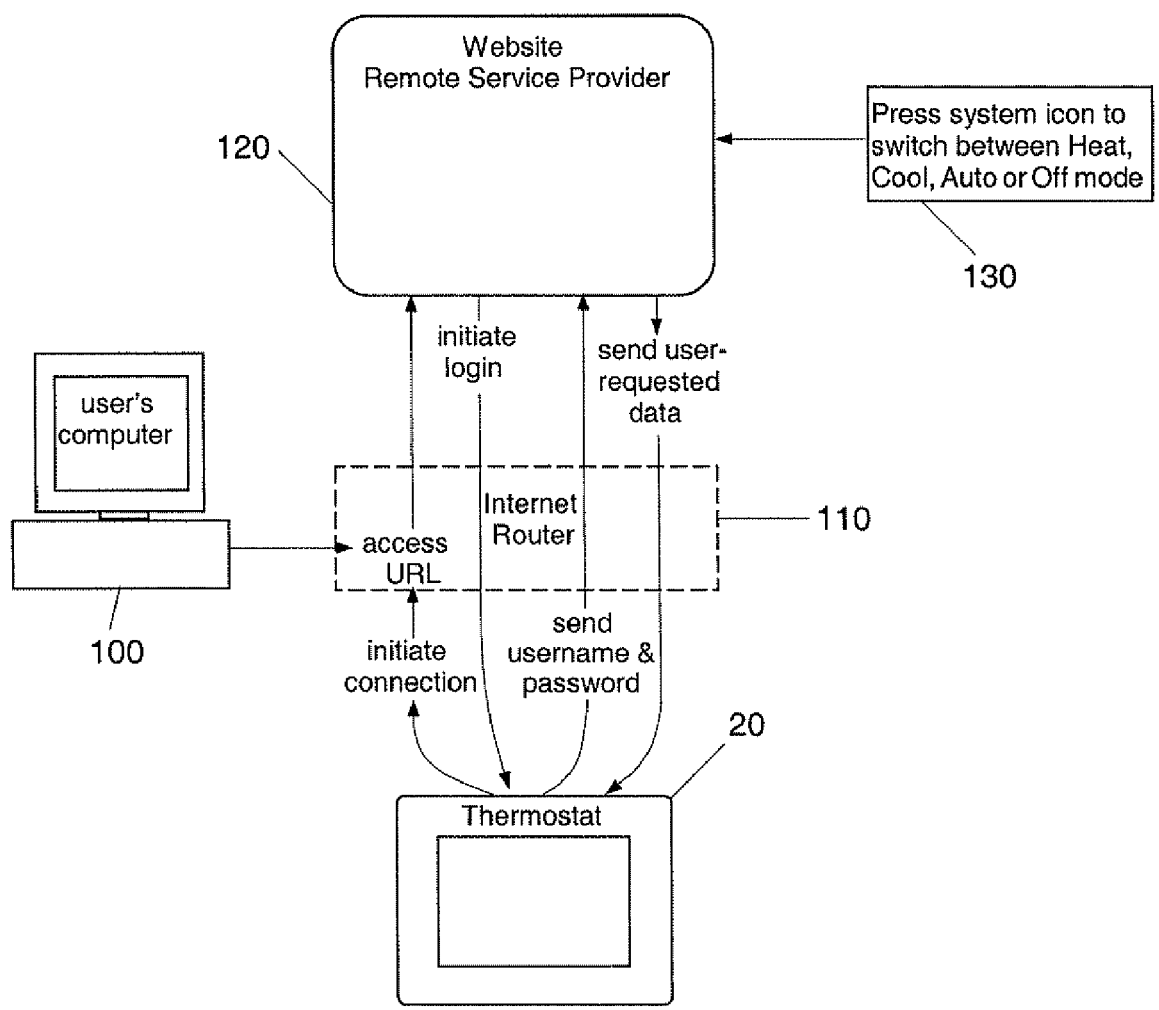
FIG. 2 is a functional block diagram of a thermostat in communication with a remote service provider in one exemplary embodiment.

In one embodiment of the present invention, the information to be displayed is preferably tailored to the particular user's interests, by means of a user profile which the user establishes. As shown in FIG. 2, the user profile is preferably established by the user initiating connection from a computer 100 to the internet 110 to access the website of a service provider 120, where the user may set up a new account for the desired services. The user or subscriber would establish a username and password to be associated with the subscriber's user profile, as part of the subscribers initial login process. Alternatively, the user's password could also be emailed to the user by the service provider 120.

At this point, the server 120 associated with the service providers website require login of the user name and password by the user. Once this is verified, the server 120 will access a database to retrieve detailed user profile information stored by the service provider. If the user is a new user, the server 120 would prompt the new user to enter specific information such as the user's area or zip code, which could be used to obtain information local to the area. The user would be able to select information that the user would like to receive, such as the day's high and low forecast temperatures, the chance of precipitation, local sports scores, or other related information. The login name, associated password, as well as user profile and information preferences may be stored in the service provider's database. It should be understood that that user may select various requested information and options for use with the thermostat 20, which may be limited only by the service provider and the amount of information that the thermostat 20 is capable of displaying or utilizing. Once the subscriber completes the user profile set up with a service provider, the subscriber may change the profile at any time by accessing the service provider's website using a computer.

Once the user has set up an account and user profile with a remote service provider, the user subsequently enters the data into the thermostat 20, in particular, the service provider's website, and a username and password. The microprocessor of the thermostat 20 then periodically establishes connection via the network interface 26 with the website, and provides the username and password for login. In the first embodiment, the thermostat 20 establishes connection with the website at least once daily, and preferably establishes contact at least once in the morning and once in the afternoon. The user may also press a particular icon on the touch screen interface, or press and hold a menu icon 38 to prompt the thermostat 20 to establish connection to the website via the internet.

When the thermostat 20 initiates an internet connection session through the network interface 26, the thermostat will request access to the service provider's URL that the user has entered. The service provider's website will prompt the login of the thermostat, which then provides the user name and password that the user entered. Once login is verified and the thermostat 20 gains access to the service provider's server, the service provider will access a subscriber database and retrieve the user's profile. The server can also identify the one or both of the "IP" or "MAC" number associated with the thermostat 20, for storage with the user's profile. The service provider may periodically perform an analysis of the user profile, and perform a search for the various types of information to be retrieved for the particular user. The service provider's server may establish connection with various information servers in the service provider's system, or through the internet. For example, the service provider may obtain local forecast information from the national Weather Service Provider (WSP), and may store packets of information associated with the particular user for subsequent transmission to the user. The service provider may accordingly retrieve the information associate with the user's profile through various means, and may compile an ASCII text message for later submission to the thermostat. The remote service provider accordingly does not have to initiate a search when contacted by the thermostat 20 to retrieve the various requested information, and accordingly provides a faster response time. The requested information, which is compiled into a relatively small electronic file size, may be easily retrieved from storage for transmission to the subscriber. Thus, the thermostat 20 would not require a significant processing capacity or speed to download the text message and process the message for subsequent use.

During an internet login session that is initiated by the thermostat 20, the service provider retrieves the user's profile, which is preferably based on user information voluntarily entered by the user as described above. The service provider's server then retrieves the stored information associated with the particular user's profile and responsively transmits an ASCII text message to the thermostat. Where the thermostat utilizes a 56K dial up modem, the microprocessor of the thermostat 20 would be able to quickly download and store a text message of a size preferably in the range of about 1 Kb to about 100 Kb. The thermostat's microprocessor may then store the message in memory, and responsively display the received ASCII text message, in part or in its entirety, on the thermostat's display device 32.

In some thermostat embodiments, the display device 32 displays the ASCII text in an appropriate space between various icons on the display device 32. For example, the display device 32 may display the information as shown in FIG. 1. It should be noted however that the embodiments may be adapted to display the information any where on the display device 32. The ASCII information shown in FIG. 1 may be displayed as a continuous line of text, or a plurality of lines of text. The text information could be arranged by the service provider to correspond to headings for the particular thermostat model or embodiment. Where the subscriber informs the service provider of the particular thermostat model, the service provider could responsively arrange an information packet or text message that begins with the low and high forecast temperatures followed by the chance of precipitation, as in the example shown in FIG. 1. In this example, the message text would align with the headings for the forecast 40 and chance of precipitation 42 as in FIG. 1. The message could also further include other local information, such as the score of a local sports team.

Figure 3:
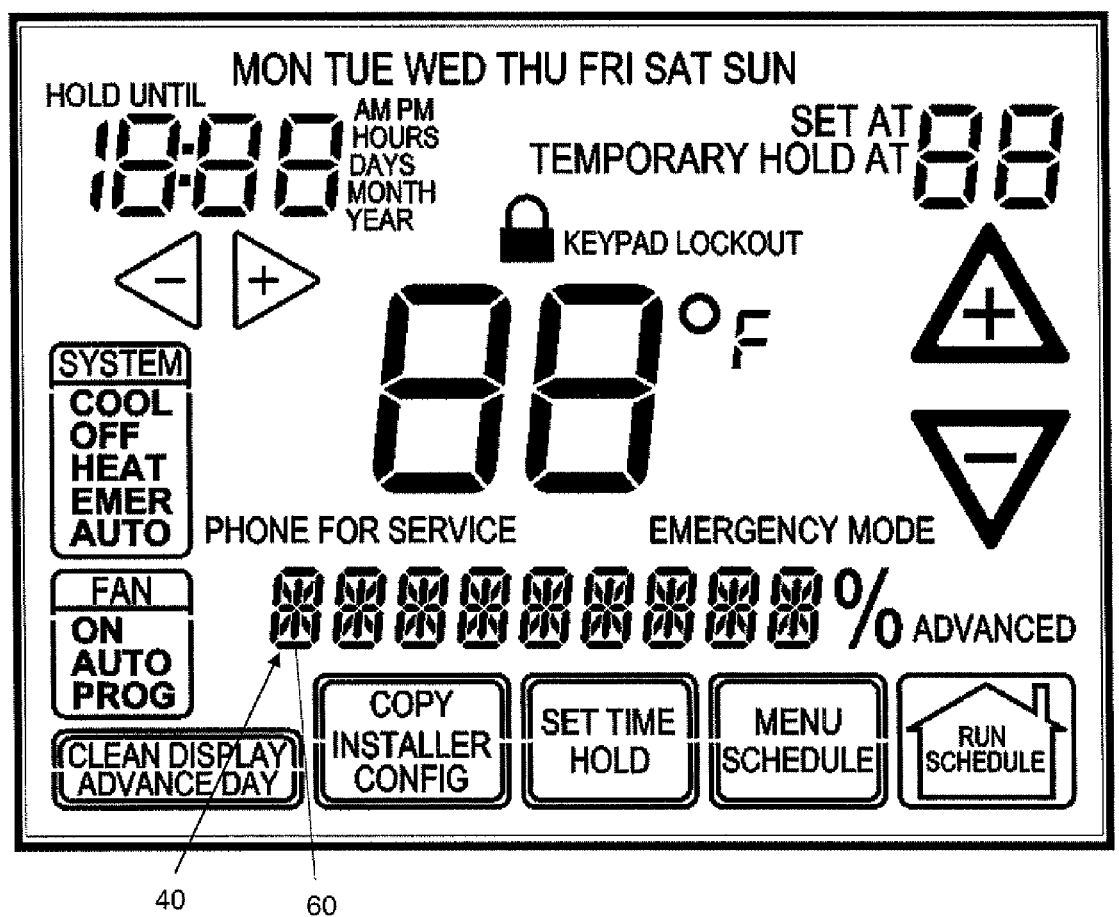
FIG. 3 is an illustration of a display image of one embodiment of a thermostat according to the principles of the present invention.

In some thermostat embodiments, the thermostat and display device could be configured to initially display the first 9 to 20 characters of the ASCII text message received from an external location or service provider. The first 9 to 20 characters could include the low and high forecast temperatures and the chance of precipitation, which could align with the headings shown in FIG. 1. After displaying the first 9 to 20 characters for a predetermined time period, the thermostat and display device could be configured to scroll the text information to allow for displaying the entire ASCII text message in a scrolling marquee manner. Some thermostat embodiments may omit the display of headings, and may provide for displaying the entire ASCII text message or received information in a scrolling marquee format as shown in FIG. 3.

Depending on the service provider, subscribers to the remote service could also be able to participate in reduction of energy consumption or energy saving options. The user or subscriber of the remote service may be able to select an option of enabling transmission of a desired temperature setting to the thermostat, or of enabling an Electric Utility provider to transmit a setback temperature setting to the user's thermostat. Emerson Retail Services is one remote service provider that, at the time of filing of this application, provides set point verification and also set point temperature change capability.

In yet another embodiment, the thermostat may be configured to periodically establish access via the internet with the remote service provider, to request transmission of only a stored temperature set point value, if any are present. Alternatively, the thermostat 20 may further comprise the capability of receiving a data bit following the end of the transmission of the ASCII text data packet, which subsequent data transmission could include a temperature value for use as a set point. The microprocessor of the thermostat 20 is preferably capable of recognizing and storing the temperature value, and temporarily changing the set point temperature of the thermostat 20 to the stored temperature value. In this manner, the thermostat temporarily overrides its programmed set point temperature for the current time period, and maintains the new "requested" set point temperature for either a predetermined time or until the next programmed time period within the thermostat. The user may therefore remotely gain access to the service provider's website using a computer, and enter a temporary desired temperature setting for the thermostat, which the thermostat 20 can retrieve and responsively alter its set point with. Thus, if a user anticipated a late arrival home or a time period that the residence would be unoccupied, the user could remotely change the thermostat temperature set point to obtain energy savings.

Likewise, the user may enable an Energy Utility provider to submit a setback temperature setting to the remote service provider. By cooperating with a remote service provider such as Emerson Retail Services, an Energy Utility provider would be able to request thermostat setbacks to a base of service providers to effect a significant reduction in operation of residential climate control systems during peak energy demand periods. Thus, this embodiment of a thermostat that communicates with a remote service provider provides a valuable service to both the individual subscriber and a utility, to benefit the user and the community as well.

During periods of peak energy demand when a utility submits a setback temperature through the remote service provider to temporarily changing the thermostat of a subscriber, the thermostat 20 may display the requested set back temperature 44 on the display device 32 as shown in FIG. 1. In this manner, the user may view the Utility's request for set back temperature, and may manually override the set back temperature by adjusting the temporary temperature set point using up and down inputs 34 and 36 on the thermostat 20. The user could further have the ability to remotely access the service provider website and override the Utility's entry, if the user so desires. Thus, the thermostat could also provide for overriding a set point temperature change received from a remote service provider.

Referring to FIG. 3, some embodiments of a thermostat may be configured to display text 40 in a scrolling format on a portion of the display device 32. The information displayed as text 40 preferably comprises about 9 to 20 characters, which characters are made up of segments that allow for displaying a variety of alphanumeric characters. One thermostat embodiment comprises a display device 32 having a plurality of segmented characters 60 configured to display alphanumeric symbols to provide for displaying a text message 40 as shown in FIG. 3, and a microprocessor in communication with the display device being configured to display a text message of any length. The microprocessor is configured to communicate a portion of the text message to the display device 32 for display thereon, wherein the microprocessor iteratively communicates portions of the text message to the display device to provide a scrolling marquee for displaying the text message 40 in its entirety. The display device 32 in FIG. 3 is a Liquid Crystal Display that comprises at least about nine characters 60 having a plurality of segments that may be used to display alphanumeric symbols to form words, numbers or other characters. A Liquid Crystal Display may often have an icon for each word or symbol. Likewise, the LCD has an icon for each segment of a letter. The LCD in FIG. 3 has at least about nine characters and up to 20 characters 60, each of which comprise 14 segments, for a total of 126 icons to 250 icons. This is much less that a costly dot matrix LCD display, which may have as many as 6,000 icons. Moreover, the dot matrix LCD display also requires a display driver that is not required in the display device as in FIG. 3.

A microprocessor of the thermostat is configured to send display data to the Liquid Crystal Display device, which responsively displays the appropriate data as text 40 and refreshes the display of text data 40 shown in FIG. 3 to provide a scrolling marquee of information to the user. The use of an LCD having a plurality of characters comprising a number of segments that allow for display of various alphanumeric characters provides an advantage over dot matrix type thermostats, in that the LCD display consumes less power and is less expensive. The various thermostat embodiments comprising a display having a plurality of segmented characters that allow for displaying a scrolling marquee accordingly provide a simple means for displaying to the user text information of different lengths, without using up a substantial portion of the display area. Such thermostat embodiments may accordingly display received information without having to truncate the information, or parse the received information to display certain portions of the information on the display. Rather, the thermostat would simply be able to receive information and responsively display the information as received in its entirety to the user. The LCD display shown in FIG. 3 also provides for display of scrolling text information to the thermostat user, without requiring a costly power consuming dot matrix display that would reduce battery life of the thermostat. The thermostat comprising a display having a plurality of segmented characters that allow for displaying a scrolling marquee accordingly provide a simple means for displaying to the user text information of different lengths, without using up a substantial portion of the display area. Thus, the thermostat could receive an ASCII text message from an external connection and display the text message in its entirety in a scrolling marquee fashion. The thermostat could also display information relating to the thermostat itself, such as user instructions for selecting appropriate icons to program the thermostat, or other information such as the humidity in the space.

In some thermostat embodiments, the thermostat is configured to provide diagnostic information relating to operation of the thermostat or other HVAC components that it is in communication with. Accordingly, some thermostat embodiments may provide for display of diagnostic text information pertaining to the operating status of the thermostat or the HVAC system components, where the text information received by the thermostat may be of different lengths. Rather than providing a predetermined number of flashing indicia corresponding to a diagnostic code, the thermostat would provide the user or repair technician with detailed diagnostic information for troubleshooting or restoring system operation. Such information would not be restricted by a text or display size limit, and could be displayed repeatedly in a scrolling marquee fashion. For example, the thermostat may be configured to communicate with and receive diagnostic information from a furnace control, which may indicate a failed attempt to attain ignition due to either a faulty hot surface igniter or a degraded flame sensor. The thermostat could accordingly display the above failure in a scrolling marquee fashion on the display device 32, such that the technician would not have to obtain or refer to a diagnostic manual for identifying the fault corresponding to a number of flashes. The thermostat could further display required maintenance, such as filter replacement, or display a service phone number stored in memory that the user of the thermostat could call for service. The thermostat is capable of storing a plurality of messages relating to troubleshooting of operating conditions of the system. This could aid the operator with diagnosing system maintenance, problems that would require repair, replacement of thermostat batteries or the thermostat itself. The thermostat accordingly could display one of a plurality of stored messages for aiding the user with the operation of the thermostat. Thus, the various embodiments provide for display of text information of any length in a small display area on the display device, to enhance the amount of information the user may view from the thermostat.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A thermostat for controlling a climate control system, comprising:
    a network interface for establishing an internet connection with a website of a remote service provider;
    a microprocessor for controlling the operation of a climate control system, the microprocessor being in communication with the network interface for periodically establishing an internet connection via the network interface and receiving user-specified information from a website of a remote service provider that maintains a user-profile in which the user can tailor or select the information that the user would like to have sent to the user's thermostat from the remote service provider in the form of a text message, which information comprises weather information including the day's forecasted temperature; and a display device having a plurality of characters each of which comprise segments that allow for displaying a variety of alpha-numeric characters, the display device being responsive to the microprocessor for displaying at least a portion of the text message received, which text message includes the user-specified information including the day's forecasted temperature received via the network controller from the remote service provider.

2. The thermostat of claim 1 wherein the network interface is adapted to establish an internet connection through a dial up modem and phone line.

3. The thermostat of claim 1 wherein the network interface is adapted to establish a wireless internet connection through a WiFi 802.11b wireless router.

4. The thermostat of claim 1 wherein the user specific information comprises at least weather forecast information of a high temperature and a low temperature, which align with weather forecast headings on the display device.

5. The thermostat of claim 1 where upon the thermostat establishing connection with the remote service provider, the remote service provider responds to the thermostat's identification by providing a data message containing user-specified information.

6. The thermostat of claim 1 wherein the user-profile comprises a request by the user for specific information, which the remote service provider prepares and provides to the thermostat when the thermostat establishes connection with the remote service provider.

7. The thermostat of claim 1, wherein the microprocessor is configured to communicate a portion of the received text message to the display device, and to iteratively communicate portions of the text message to the display device to provide for displaying the text message in its entirety in a scrolling marquee fashion.

8. The thermostat of claim 7 wherein the microprocessor is further configured to iteratively communicate successive portions of the text message to the display device to provide for displaying portions of the text message using the 9 to 20 characters, such that the text message is displayed in its entirety in portions up to 20 characters at a time, to thereby display the entire text message in a scrolling marquee fashion using only 9 to 20 characters.

9. A thermostat for controlling a climate control system, comprising:
a network interface for establishing an internet connection with a website of a remote service provider;
a microprocessor for controlling the operation of a climate control system, the microprocessor being in communication with the network interface for periodically establishing an internet connection via the network interface and receiving user-specified information from a website of a remote service provider that maintains a user-profile in which the user can tailor or select the information that the user would like to have sent to the user's thermostat from the remote service provider in the form of a text message, which information comprises weather information including the day's forecasted temperature; and
a display device in communication with the microprocessor, the display device having at least one heading indicative of a weather forecast, and a plurality of characters each of which comprise segments that allow for displaying a variety of alpha-numeric characters, such that the display device is configured to display at least the first 20 characters of the text message;
wherein the microprocessor is configured to communicate an initial portion of the received text message including the day's forecasted temperature to the display device to cause the display of the day's forecasted temperature in alignment with the at least one heading on the display device, the microprocessor being further configured to iteratively communicate portions of the text message to the display device to provide for displaying the text message in its entirety in a scrolling marquee fashion via the plurality of characters comprising segments.

10. The thermostat of claim 9, wherein the plurality of characters preferably comprises between 9 and 20 characters, each character being made of segments configured to display a variety of alpha-numeric characters.

11. The thermostat of claim 10 wherein the microprocessor is further configured to iteratively communicate successive portions of the text message to the display device to provide for displaying portions of the text message using the 9 to 20 characters, such that the text message is displayed in its entirety in portions up to 20 characters at a time, to thereby display the entire text message in a scrolling marquee fashion using only 9 to 20 characters.

12. The thermostat of claim 11 wherein the network interface is adapted to establish a wireless internet connection through a WiFi 802.11b wireless router.

13. The thermostat of claim 12 wherein the thermostat is configured to permit the user to enter data of the remote service provider's website, a username and a password for establishing a connection with the remote service provider via the wireless internet connection.

14. The thermostat of claim 11 wherein the network interface is adapted to establish an Internet connection through a dial up modem and phone line.

15. A thermostat for controlling a climate control system, comprising:
a microprocessor that is configured to control operation of the thermostat, and configured to receive a text message;
a display device in communication with the microprocessor, the display device including:
a first portion of the display device having a plurality of segmented characters that are configured to display alpha-numeric symbols such that the plurality of segmented characters are configured to display portions of a text message on the display; and
a second portion of the display device having segmented characters thereon configured to display symbols for displaying a header or other information;
wherein the microprocessor is configured to communicate to the display device information for display on the second portion of the display device having the segmented characters, and is further configured to iteratively communicate portions of the text message to the display device to provide a scrolling marquee, using the plurality of segmented characters, for displaying the text message in its entirety.

16. The thermostat of claim 15 wherein the microprocessor is configured to receive a text message in its entirety, and thereafter to iteratively communicate portions of the text message to the display device to provide a scrolling marquee for displaying the text message in its entirety.

* * * * *